Oct. 27, 1936.  A. J. SMITH  2,059,049
FASTENER FOR TRIM PANELS
Filed May 29, 1930
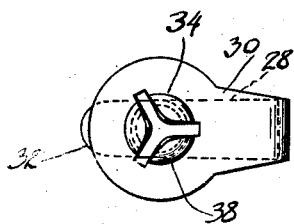
Fig. 1
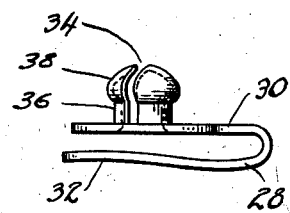
Fig. 2
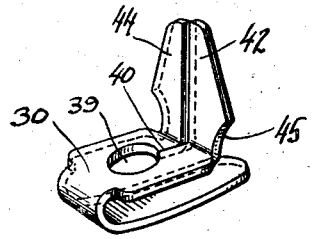
Fig. 3
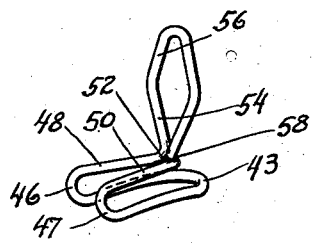
Fig. 4
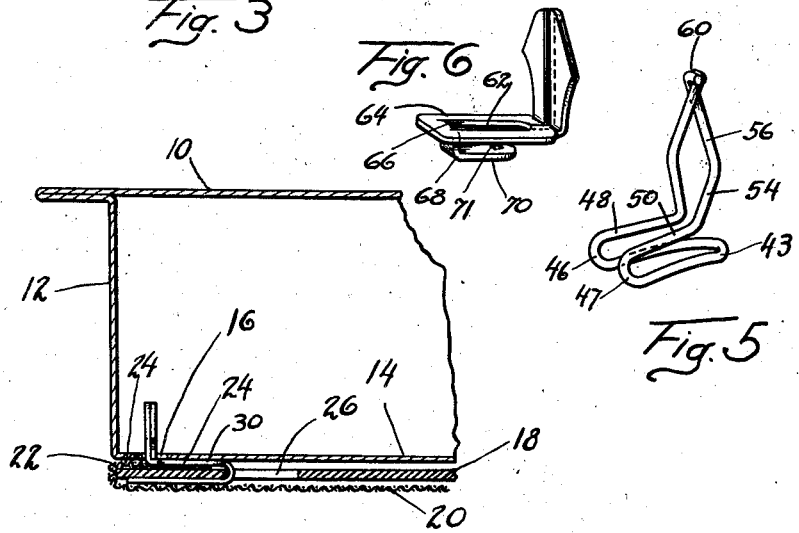
Fig. 6
Fig. 5
Fig. 7
INVENTOR.
Alfred J. Smith
BY
Parker & Burton
ATTORNEYS Patented Oct. 27, 1936

2,059,049

UNITED STATES PATENT OFFICE 2,059,049

FASTENER FOR TRIM PANELS

Alfred J. Smith, Detroit, Mich., assignor, by mesne assignments, to United-Carr Fastener Corporation, Cambridge, Mass., a corporation of Massachusetts Application May 29, 1930, Serial No. 457,484
In Canada November 17, 1930

4 Claims. (Cl. 24—213)

My invention relates to fastening devices and has particular reference to an integrally formed fastener adapted to secure automobile body panels to the frame of the automobile body.

It is customary to ship panels designed to be used in the interior of automobile body structures, either with or without the trim applied thereto, in large lots and subsequently secure the panels to the frame of the automobile body at the body plant. The panels are formed of cardboard or similar fibrous material possessing the desired physical characteristics.

The trim for these panels is sometimes applied thereto prior to their being shipped and sometimes after the panels have reached the body plant and are all ready for assembly. It is the practice to apply the trim material over one entire face of such a panel, folding over the outer portions of the trim material and securing the same to the rear edges of the panel.

In order to facilitate shipping, storing, and handling the panels it is desirable that some arrangement be provided whereby means for fastening them to the frame of the automobile body may be applied to the panels after they have arrived at their destination and are ready to be fastened in place. Inasmuch as the panels are usually trimmed prior to the fastening operation it is desirable that some means be provided whereby a fastening device may be secured to the panel from the rear or untrimmed face thereof and subsequently secured to the automobile body frame from the front of the panel.

An object of my invention is to provide an integrally formed fastening device which is capable of functioning as specified above and which will seat firmly and rigidly upon the panel at whatever position it is secured, thereby rendering it unnecessary to apply pressure to the fastening element itself in order to snap the panel into place.

Still a further object of my invention is to provide an integrally formed fastener so shaped that it may be inserted through an aperture in the panel from the rear thereof without disturbing the trim upon its outer face and made to grip the opposite faces of the panel at any one of a number of positions, within a limited range, to which it may be adjusted. The accepted method of fastening such a panel to the body frame is to provide apertures in the frame into which fastening devices already secured to the panel are adapted to be inserted. Hitherto it has been important that the apertures in the panel and those in the frame be in substantial alignment with one another because of the fact that the fastening device utilized in conjunction with the panel is not capable of adjustment with relation thereto.

By providing a U-shaped saddle base portion, the arms of which are flexible, I am able to adjust the position of my fastener device with relation to the panel by sliding the gripping flexible arms to any position within a range limited by the length of the arms. Inasmuch as I have located my snap fastening means which engages the body frame structure at one extremity of one of the flexible arms of my saddle base the snap is provided with a firm, unyielding base consisting of the panel itself and the other arm of the saddle base. For this reason pressure may be applied to the panel at substantially any point and sufficient of this pressure will be transmitted through the panel to the point of support of the snap fastener to properly engage the fastener with the aperture in the automobile body frame.

Various other advantages and meritorious features of my invention will be apparent from the following description taken in conjunction with the drawing wherein:

Fig. 1 illustrates a plan view of one form of fastener,

Fig. 2 is an elevation thereof,

Fig. 3 is a perspective of a somewhat different embodiment,

Figs. 4, 5, and 6 are perspectives of still other embodiments, and

Fig. 7 illustrates the use of my fastener showing the embodiment of Fig. 3.

In Fig. 7 I have illustrated the use of my improved type of fastening element in conjunction with the frame 10 of an automobile body. This frame extends inwardly from its outer portion 10, as at 12, and is provided with a flange 14 extending parallel to said outer face 10 and having a series of apertures 16. One face of fiber panel 18 is provided with a trim material 20 which is folded over the edge of the panel as at 22 and secured to the said panel on its opposite face 24.

The panel itself is provided with an aperture 26 through which my fastener is adapted to be inserted, and it will be noted that it is immaterial whether or not the aperture of the panel is in alignment with the aperture 16 provided in the flange of the body frame. It is necessary only that the distance between the nearest edges of apertures 16 and 26, when the panel is properly alined with the body frame, should not exceed the distance from the trough of the U-shaped gripping saddle to the near side of the fastener element.

My improved fastener consists essentially of a U-shaped gripping saddle portion consisting of flexible arms 28 and 30. These arms may be of any desired length, the length depending upon the desired possible maximum displacement between the apertures in the panel and those in the body frame and the extent of gripping surface sought. One arm 28 of my gripping saddle may be curved somewhat inwardly toward the other arm as at 32 for the purpose of gripping the panel more firmly.

Secured to the outer face of the inner arm 30, or constituting an integral part thereof, is a snap fastener part 34 which is designed for insertion through the aperture 16 of the body frame for the purpose of securing the panel thereto. This snap fastener may consist of any of a number of desirable forms.

In Figs. 1 and 2 I have illustrated what is commonly known as a rosebud fastener which consists of a shank portion comprising a plurality of yielding members 36, each of which is provided at its upper extremity with a protruding head portion 38.

In Figs. 3 and 7 I have indicated another type of fastening element, wherein the arm 30 of the gripping saddle is slit from an aperture 39 therein to the outer extremity of the arm, as at 40 and the said outer extremity is bent into a plane normal to that of the saddle, the two split portions 42 and 44 lying in planes parallel and adjacent to overlap one another to permit their expansion and contraction when being inserted into the body frame apertures 16. Each of the portions 42 and 44 is cut away inwardly at its base, as at 45, to form a positive lock securing the panel to the frame.

Fig. 4 illustrates a modification wherein the fastening device is formed of a single piece of stout wire bent as at 43 to form a U-shaped base, said base being doubled back upon itself as at 46 and 47 to provide the gripping saddle structure as illustrated in the other modifications. The upper arms 48 and 50 are pinched inwardly at their outer ends as at 52 and the remaining portion is bent upwardly to a plane substantially normal to that of the saddle, first diverging as at 54 and subsequently converging as at 56 to permit ready insertion for the fastener into the frame aperture and subsequent locking therein. It will be noted that in Fig. 4 the two ends of the wire contact one another at 58.

In Fig. 5 another embodiment of my fastener is disclosed. This is somewhat similar to that disclosed in Fig. 4 except that the extremities of the stout wire of which the fastener is composed came together at the upper, or insertion, extremity 60 of the snap fastener portion. One extremity is twisted around the other as indicated so that no ragged edges appear on a camming surface is provided which assists in the insertion of the fastener into the frame apertures 16. The modification disclosed in Fig. 6 is very similar to that of Figs. 3 and 7, except that the gripping saddle is stamped out to leave an aperture 62 in one arm 64 and the stamped out portion is bent as at 66 and 68 to form the other arm 70. This arm 70 may be punched out to provide a tooth like projection 71 which will engage the panel structure to prevent detachment therefrom.

While I have illustrated certain embodiments of my improved fastener structure others will be apparent to those skilled in the art and for that reason I intend to limit myself only within the scope of the appended claims.

What I claim:

1. An integral fastener comprising a strip of sheet metal bent to form an angle intermediate the ends thereof, one side of said angle being slotted along its length and the other side thereof having a portion struck outwardly therefrom and bent into a plane parallel to the unstruck portion to form therewith a pair of gripping arms.

2. A fastener of the character described formed of a single piece of sheet metal comprising a saddle portion provided with spaced apart parallel resilient arms, one arm being punched out from the other, one arm of said saddle being provided with projecting angular resilient arms arranged to be compressed into overlapping relationship.

3. A fastener of the character described comprising a stud formed from a single piece of sheet metal and having a U-shaped base, a pair of flat, thin projections extending from said base and offset with relation to each other so that when moved toward each other edgewise one may cross the other, said projections having outer narrow edge portions diverging and shaped to enter and making fastening engagement with a cooperating fastener socket, and said base being split adjacent to where the projections extend therefrom to permit said projections to move toward each other in an edgewise manner.

4. A snap fastener member of the class described formed from a single piece of metal and having a U-shaped base, a pair of projections extending from said base adjacent to one end and being offset with relation to each other to permit a scissors-like action of said projections, said projections having opposed outer edges shaped to make snap fastening engagement with a cooperating snap fastener-receiving part, and said snap fastener member having closely arranged abutable portions extending toward each other adjacent to where the projections and base join to control the action of said projections during movement toward each other.

ALFRED J. SMITH.